United States Patent
Turanyi et al.

(10) Patent No.: US 8,463,926 B2
(45) Date of Patent: Jun. 11, 2013

(54) TECHNIQUE FOR PROVIDING SUPPORT FOR A PLURALITY OF MOBILITY MANAGEMENT PROTOCOLS

(75) Inventors: Zoltan Richard Turanyi, Szentendre (HU); Gergely Pongracz, Budapest (HU); Stefan Rommer, Västra Frölunda (SE); Goran Hall, Mölndal (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 320 days.

(21) Appl. No.: 12/682,368

(22) PCT Filed: Oct. 9, 2007

(86) PCT No.: PCT/EP2007/008768
§ 371 (c)(1),
(2), (4) Date: Jul. 15, 2010

(87) PCT Pub. No.: WO2009/046737
PCT Pub. Date: Apr. 16, 2009

(65) Prior Publication Data
US 2010/0281148 A1    Nov. 4, 2010

(51) Int. Cl.
*G06F 15/16* (2006.01)
(52) U.S. Cl.
USPC ............................ 709/230; 709/203; 709/220
(58) Field of Classification Search
USPC .................. 709/203, 220–222, 227, 228, 230
See application file for complete search history.

(56) References Cited

U.S. PATENT DOCUMENTS

| | | | |
|---|---|---|---|
| 7,149,225 B2 * | 12/2006 | Thubert et al. | 370/401 |
| 7,746,876 B2 * | 6/2010 | Rune et al. | 370/401 |
| 8,078,753 B2 * | 12/2011 | Bachmann et al. | 709/238 |
| 8,104,081 B2 * | 1/2012 | Khanna et al. | 726/15 |
| 2004/0229608 A1 | 11/2004 | Isukapalli | |
| 2007/0165655 A1 | 7/2007 | Haumont | |
| 2009/0238115 A1 * | 9/2009 | Yamane | 370/328 |
| 2010/0135243 A1 * | 6/2010 | Larsson et al. | 370/331 |
| 2010/0268583 A1 * | 10/2010 | Backman | 705/14.4 |
| 2011/0103340 A1 * | 5/2011 | Zhu et al. | 370/329 |

OTHER PUBLICATIONS

Hong-Wei Lin et al: "Accepted from open call—A gateway approach to mobility integration of GPRS and wireless LANs" IEEE Wireless Communications, IEEE Service Center, Piscataway, NJ, US, vol. 12, No. 2. Apr. 1, 2005 pages 86-95.
3GPP: "3GPP System Architecture Evolution: Report on Technical Options and Conclusions (Release 7)" $3^{rd}$ Generation Partnership Project (3GPP), Technical Report (TR) TR23.882 V.1.11.0, vol. 23.882, No. v1.11.0, Jul. 1, 2007, pp. 1-211.

* cited by examiner

*Primary Examiner* — Phuoc Nguyen (57) ABSTRACT

A technique for registering a mobile terminal with an anchor node and for handling data packets after registration is provided. A method implementation of this technique comprises the steps of providing support for a plurality of mobility management protocols, wherein the mobility management protocols are deployed in parallel within a protocol stack of an anchor node, receiving, from a mobile terminal, a registration message, and selectively handling the registration message in accordance with the mobility management protocol associated with the registration message.

9 Claims, 5 Drawing Sheets

TECHNIQUE FOR PROVIDING SUPPORT FOR A PLURALITY OF MOBILITY MANAGEMENT PROTOCOLS

TECHNICAL FIELD

The invention generally relates to the field of registering a mobile terminal with a node acting as a mobility anchor for mobile terminals, and to the field of handling data packets after registration. More specifically, the invention relates to a technique for registering a mobile terminal with an anchor node which supports a plurality of mobility management protocols, and for handling data packets after registration.

BACKGROUND

Modern mobile terminals are capable of providing network access to a plurality of communication networks. For example, there are mobile terminals which are capable of providing network access to second (2G) and third generation (3G) mobile telephone communication systems and additionally to a wireless local area network (WLAN).

In order to avoid setting up a separate communication network for each network access technology, there are solutions under development which integrate multiple access technologies. However, such solutions provide the challenge that a plurality of mobility management protocols, which are used according to respective network access technologies, have to be handled within the communication network at the same time. One problem of such solutions under development is that they have extensive signalling requirements for handling more than one mobility management protocol at the same time.

A known class of mobility management protocols for packet switched data networks employs a so-called "mobility anchor". A mobility anchor is a network element which receives data packets for a specific mobile terminal and tunnels them to the actual location of the mobile terminal. Tunneling means a transmission of data packets intended for use only within a certain target network through another network in such a way that the routing nodes in the other network are unaware that the trans-mission is intended for the target network. Tunneling is generally done by encapsulating the target network data and target protocol information within the other network's transmission units.

Protocols according to this class of mobility management protocols include e.g. Mobile IPv6 (MIPv6), Mobile IPv4 (MIPv4) and the General Packet Radio Service (GPRS) Tunneling Protocol (GTP). MIPv4 is a mobile Internet protocol (IP) that allows a mobile terminal to continue using its permanent home address as it moves around the Internet. Mobile IPv4 is described in document MIPv4-IETF RFC3344 published by the Internet Engineering Task Force (IETF). MIPv6 is a mobility management protocol which was developed as part of Internet Protocol version 6 (IPv6) in order to support mobile connections. MIPv6 is a standard which was designed to authenticate mobile terminals using IPv6 addresses. A detailed description of MIPv6 can for example be obtained from document MIPv6-IETF RFC3775 published by the Internet Engineering Task Force. GTP is an IP based mobility management protocol which is used within Global System for Mobile communication (GSM) and Universal Mobile Telecommunications System (UMTS) mobile communication networks. GTP is described in document 3GPP TS 29.060 by the Third Generation Partnership Project (3GPP).

Although these mobility management protocols have a similar approach on how they manage mobility (for example they all use anchor nodes, tunneling techniques and location update messages), they differ significantly with regard to additional features which are applicable to various user-specific network scenarios and which were adapted in order to be accepted by certain network operators. For example, GTP is a network centric protocol, in which local network entities, e.g. the Serving GPRS Support Nodes (SGSNs), initiate mobility signalling. Contrary to this, MIPv4 and MIPv6 are terminal centric protocols, according to which mobility signalling is initiated by the mobile terminal. Furthermore, GTP is widely used in 3GPP networks. However, other communication networks do not employ GTP.

Problems arise in case more than one mobility management protocol, and in particular a combination of network centric and terminal centric protocols, will be employed in a communication network. Such mobility management protocols and related messaging will have to be processed and handled at the same time. This requires high processing power within the network elements, and the signalling load increases accordingly. Moreover, in order to route data packets to the desired mobile terminals, a plurality of dedicated mobility anchors in the transmission path of the user plane will become necessary.

SUMMARY

Accordingly, there is a need for a technique for registering a mobile terminal with an anchor node, and for handling data packets after registration, which supports a plurality of mobility management protocols and which avoids at least some of the disadvantages outlined above.

This need is satisfied according to a first aspect by a method for registering a mobile terminal with a node acting as a mobility anchor ("anchor node") for mobile terminals. The method comprises the steps, performed by the anchor node, of providing support for a plurality of mobility management protocols, receiving, from the mobile terminal, a registration message, and selectively handling the registration message in accordance with the mobility management protocol associated with the registration message. The mobility management protocols are deployed in parallel within the protocol stack of the anchor node. They may be employed side-by-side (i.e., in a non-hierarchical manner) and activated independently from each other for a particular user terminal.

According to a further aspect, a method for handling data packets in accordance with a mobility management protocol is provided, in which the mobility management protocol is implemented on a node acting as a mobility anchor for mobile terminals and capable of forwarding the data packets within a communication network. The method comprises the steps, performed by the anchor node, of receiving data packets from or addressed to a mobile terminal, identifying a mobility management protocol associated with the mobile terminal, and selectively handling the data packets depending on the associated mobility management protocol, wherein a plurality of mobility management protocols are deployed in parallel within the protocol stack of the anchor node. The handling may include forwarding the data packets in accordance with the associated mobility management protocol within the communication network.

The anchor node may be any kind of network element, or it may be implemented within any kind of network element capable of receiving registration messages and/or capable of receiving and transmitting data packets. The receiving and transmitting of registration messages and/or data packets does not have to be a direct routing from and to the anchor node. The routing can take place via a plurality of network elements, e.g. network routers or transceiver equipment. The anchor node may comprise at least a first anchor component and a second anchor component, which can respectively handle the functionalities according to a first and a second mobility management protocol, i.e. handle registration messages and, optionally, data packets according to a first and a second mobility management protocol. The first anchor component and the second anchor component may be implemented in one common or in a distributed anchor node.

According to the approach proposed herein, at least two mobility management protocols may be deployed and handled in parallel within an anchor node. The parallel deployment can be implemented contrary to a hierarchical control approach (in which one mobility management protocol controls or supersedes another mobility management protocol), so that none of the mobility management protocols is controlling or superseding another mobility management protocol. For example, incoming registration messages may be handled depending on the (single) mobility management protocol they belong to by a respective anchor component in a selective way. Similarly, incoming data packets may be handled depending on the (single) mobility management protocol they belong to by a respective anchor component in a selective way. Handling registration messages and data packets in a selective way means that only those anchor components handle respective registration messages and/or data packets which support the associated mobility management protocol.

A registration message may be one of a Create PDP Context message, a first Registration Request or an IKEv2 message containing a configuration request. For GTP, the registration message can be a Create PDP (Packet Data Protocol) Context message. The PDP Context is a data structure which is present at both SGSN and GGSN and contains information when a mobile terminal has an active session. For MIPv6, the registration message can be a first Registration Request message or an IKEv2 message containing a configuration request. IKEv2 is a version of the Internet Key Exchange protocol, which is used to negotiate a security association at the outset of an IP security (IPSec) session.

The mobile terminal may be capable of communicating by means of the plurality of mobility management protocols, i.e. the plurality of mobility management protocols may be used by the same mobile terminal.

In one method implementation, a network address for the mobile terminal is received. The network address may be received by the anchor node from a data base. The network address may be an IP address or a prefix which identifies a mobile terminal within the anchor node.

After receipt of a registration message from the mobile terminal at the anchor node, the anchor node may transmit an identifier associated with the mobile terminal or a subscriber, such as a user ID, to a data base. The network address may then be received from the data base in response to the transmission of the identifier. The identifier may provide an association of the registration message with a mobile terminal. The data base may check or establish an association of the identifier with a mobile terminal and may thereafter return a respective network address. The data base may also provide an association of the identifier with a mobility management protocol or an anchor component.

According to one aspect, one and the same network address is received for the mobile terminal independent of the associated mobility management protocol. For example, a mobile terminal may send a first registration message associated with a first mobility management protocol to an anchor node. Thereafter (e.g., in context with another network access), the same mobile terminal may send a second registration message in accordance with a second mobility management protocol to the anchor node. Independent of the signalled mobility management protocol, the same network address is allocated by the data base to this mobile terminal. Thereby, it is ensured that data packets from the same mobile terminal are routed to the correct destination independent of the network access technology (i.e., the mobility management protocol) the mobile terminal uses.

According to a further optional aspect, the network address received for the mobile terminal is forwarded by the anchor node, together with information about the mobility management protocol associated with the mobile terminal, to an access router. A message sent from the anchor node to the access router may contain the network address and an indication of an anchor component (and/or of a mobility management protocol). This method step informs the access router about which one of the first and second anchor component handles registration messages and data packets from and to a certain mobile terminal (i.e., which anchor component is capable of handling registration messages and data packets according to a certain mobility management protocol). With this information, the access router is in a position to route registration messages and/or data packets from and to a mobile terminal, depending on the network access technology it uses, to a specific anchor component and vice versa. Informing the access router that data packets from a certain mobile terminal are to be routed to a certain anchor component can be realized by a Simple Network Management Protocol (SNMP), a local protocol or a Remote Procedure Call (RPC) message.

According to a further aspect, an association of the mobile terminal with one of the mobility management protocols is dependent on whether the mobile terminal has access to a home access network. In this context, one of the anchor components may be selected upon receipt of a location update message from a mobile terminal. For example, the mobile terminal may send a special location update message to a first anchor component using an applicable mobility management protocol. This special location update message instructs the anchor node to switch to a second anchor component. Later on, the mobile terminal may instruct the anchor node to switch back to the first anchor component by sending to the first anchor component a normal or another special location update message. Thereby, a best mode scenario may be realized in which only the most suitable mobility management protocol and access network is employed.

In one implementation, access to a home access network is indicated by means of a location update message, in particular a Binding Update or a Registration Request message. This aspect relates to the situation that a certain network access technology and mobility management protocol are always used by a mobile terminal in case the mobile terminal is located within the network coverage area of its home access network. This means that other network access technologies, and different mobility management protocols, are only used in case network access according to the home mobility management protocol is not available. As soon as network access according to the home mobility management protocol is available again, the mobile terminal may again perform the default home network access. This implementation may, for example, be implemented in case the home mobility management protocol is a MIP protocol. In this case, the mobile terminal sends a MIP Binding Update or Registration Request message to the anchor node. This message signals home network access to the anchor node.

Selecting one of the anchor components may also be based on an attachment of the mobile terminal to an anchor component. The act of attaching to an anchor component may also select this anchor component (e.g., for handling received data packets). Each time a mobile terminal switches from one anchor component to another anchor component, it may de-register with the old anchor component. In case the mobile terminal is to switch back to the old anchor component, it may re-register with this anchor component again. This variant provides automatic switching to the respective anchor component, i.e. handling registration messages and/or data packets according to a respective mobility management protocol, based on an attachment procedure.

An anchor component of the anchor node may also be selected by a mobile terminal or a network element which is located between the mobile terminal and the anchor node. This selection may be realized by means of a static or a dynamic configuration during attachment at a given network interface of the anchor node. For example, a mobile terminal may start its High Speed Downlink Packet Access (HSDPA) interface. Thereafter, it contacts a NodeB (base station) which will contact a SGSN. The SGSN selects a GTP anchor (GGSN). Thereafter, an access router is informed that the data packets from and to a mobile terminal having a dedicated network address are handled by a GTP anchor component.

According to a further aspect, an association of the mobile terminal with one of the mobility management protocols is dependent on the geographical and/or topological location of the mobile terminal. In this context, one of the mobility management protocols may be used depending on the geographical and/or topological location of the mobile terminal within the communication network. For example, if the mobile terminal is located in a first region of the communication network, a first mobility management protocol may be used and accordingly, a first anchor component is active within the anchor node. In case the mobile terminal moves to another region of the mobile communication network, another, i.e. a second, mobility management protocol is used and accordingly, the second anchor component is active within the anchor node. A condition for changing the anchor component from the first anchor component to the second anchor component may be the roaming of the mobile terminal to a network area in which only network access according to the second mobility management protocol is available. In this network access scenario, seamless switching of mobility management protocols dependent on network access availability may be provided, without the user of the mobile terminal recognising a change of the mobile access network.

According to a still further aspect, a method for handling data packets is provided. The method comprises the steps, performed by an access router being in communication with a node acting as a mobility anchor for mobile terminals, of receiving a network address for a mobile terminal together with information about a mobility management protocol associated with the mobile terminal, and forwarding data packets depending on the mobility management protocol associated with the mobile terminal. The access router may thus receive information indicating the particular anchor component to which data packets from a certain mobile terminal are to be routed. The access router may forward the network address, which was assigned by the data base to the mobile terminal, to the mobile terminal.

The mobile terminal may be capable of communicating by means of the mobility management protocol and at least one further mobility management protocol.

According to a further aspect, a method for registering a mobile terminal with a node acting as a mobility anchor for mobile terminals is provided. The method comprises the steps, performed by a data base being in communication with the anchor node, of receiving an identifier which is associated with the mobile terminal or a user and protocol information about at least one of a plurality of mobility management protocols that is associated with the mobile terminal, associating the identifier and protocol information with a network address, and transmitting the network address. The network address may be an IP address or a prefix.

The data base may be implemented as a central data base that stores and manages the network addresses which are assigned to a plurality of mobile terminals. The data base may be implemented within the anchor node or may be a separate entity. The data base has the purpose to keep track of, to manage, to allocate and to reallocate network addresses for mobile terminals. The data base thereby may attempt to ensure that a mobile terminal always, i.e. independent of the mobility management protocol in use, has a common identity. The common identity is preferably indicated by the network address.

According to one implementation, another identifier, which is associated with the same mobile terminal or user and which may be identical to the earlier identifier, is received by the data base in context with another network access of the mobile terminal. The mobile terminal may be compliant with more than one network access technology. In case the mobile terminal uses for the other network access another mobility management protocol, a registration message according to the other mobility management protocol will be sent to the anchor node. Thereafter, the applicable identifier (and the applicable information about the current mobility management protocol) is forwarded by the anchor node to the data base. Thereby, the other identifier, which is associated with the same mobile terminal or user, is received by the data base.

This other identifier will be associated with the same network address by the data base. After this association, the network address is transmitted to the anchor node. The data base thereby takes care that the same mobile terminal is assigned to the same network address independent of the mobility management protocol in use.

A protocol or mapping scheme may be implemented between the anchor node and the data base in order to ensure that a network address is at all time assigned to a certain mobile terminal, and that this relationship between the network address and the mobile terminal is known to the anchor node. Such a protocol or mapping scheme may be used to signal an attachment of a new mobile terminal, a detachment of an old mobile terminal and an allocation and deallocation of network addresses to and from the mobile terminals.

The invention can be practiced in the form of hardware, in the form of software or in the form of a combined hardware/software approach. As for a software aspect, a computer program product is provided. The computer program product comprises program code portions for performing one or more of the steps of the present invention when the computer program product is run on one or more components of a network. The computer program product may be stored on a computer-readable recording medium.

As for a hardware aspect, a node for use in a communication network is provided. The node is acting as a mobility anchor for mobile terminals and comprises a first anchor component for handling registration messages according to a first mobility management protocol, and a second anchor component for handling registration messages according to a second mobility management protocol. The first and second anchor components are deployed in parallel within the anchor node. The parallel deployment may be realized in that each anchor component can be activated and operated independently from the one or more other anchor components.

According to a further hardware aspect, a node for use in a communication network is provided. The node is acting as a mobility anchor for mobile terminals and comprises a first anchor component for handling data packets according to a first mobility management protocol, and a second anchor component for handling data packets according to a second mobility management protocol. The first and second anchor components are deployed in parallel within the anchor node. The anchor node may be implemented in a Gateway GPRS Support Node (GGSN) in an evolved 3GPP data packet core network.

According to a still further hardware aspect, an access router for use in a communication network comprising at least one node acting as a mobility anchor for mobile terminals is provided. The access router comprises a receiving unit for receiving a network address for a mobile terminal together with information about an anchor component of the anchor node associated with the mobile terminal, and a forwarding unit for forwarding data packets depending on the anchor component associated with the mobile terminal.

According to a further hardware aspect, a data base for use in a communication network comprising at least one node acting as a mobility anchor for mobile terminals is provided. The data base comprises a receiving unit for receiving an identifier which is associated with a mobile terminal or a user thereof and protocol information about at least one of a plurality of mobility management protocols that is associated with the mobile terminal, an associating unit for associating the identifier and the protocol information with a network address, and a transmitting unit for transmitting the network address.

According to a still further hardware aspect, a communication network comprising at least one anchor node, at least one access router and a data base is provided.

BRIEF DESCRIPTION OF THE DRAWINGS

In the following, the invention will be described with reference to exemplary embodiments illustrated in the drawings, wherein.

DESCRIPTION OF PREFERRED EMBODIMENTS

In the following, for purposes of explanation and not limitation, specific details are set forth, such as particular sequences of steps, interfaces and configurations, in order to provide a thorough understanding of the present invention. It will be apparent to one skilled in the art that the present invention may be practised in other embodiments that depart from these specific details.

Moreover, those skilled in the art will appreciate that the functions and processes explained herein below may be implemented using software functioning in conjunction with a programmed microprocessor or general purpose computers.

It will also be appreciated that while the embodiments are primarily described in the form of methods and apparatuses, the invention may also be embodied in a computer program product as well as in a system comprising a computer processor and a memory coupled to the processor, wherein the memory is encoded with one or more programs that may perform the functions disclosed herein.

In the following embodiments, various exemplary scenarios of handling a plurality of mobility management protocols are described. In these exemplary embodiments, the mobility management protocol GTP is used as a first mobility management protocol and the mobility management protocol MIPv6 is used as a second mobility management protocol. However, the present invention is not limited to the GTP or MIPv6 mobility management protocols. The present invention is thus also applicable with other mobility management protocols. The protocols may be network centric or host centric mobility management protocols or a combination thereof. Documents MIPv4-IETF RFC3344, MIPv6—IETF RFC3775 and 3GPP TS 29.060, which are describing the GTP, MIPv4 and MIPv6 mobility management protocols, are herewith incorporated by reference. The present invention is also not limited to handling only two mobility management protocols, but may be extended to the handling of three or even more mobility management protocols.

Figure 1:
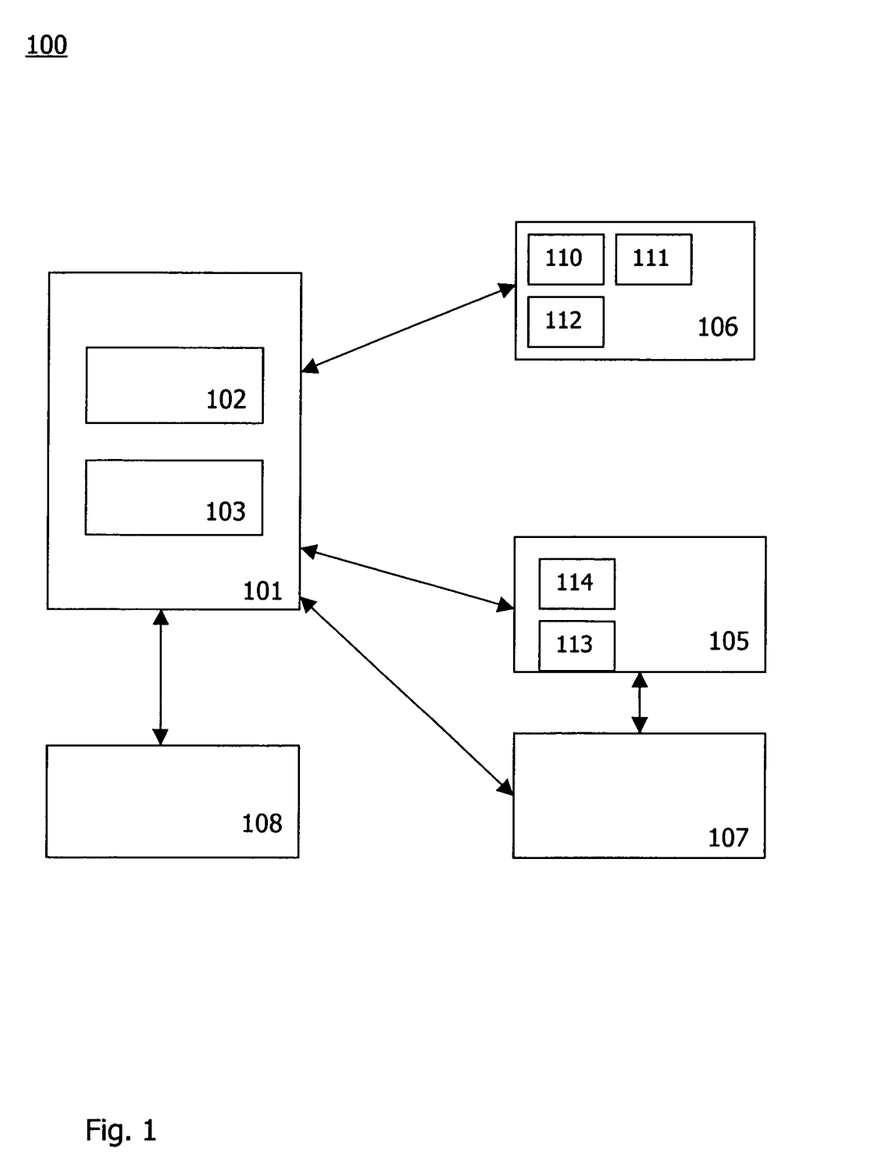
FIG. 1 is a schematic block diagram illustrating a communication network including apparatus embodiments.

FIG. 1 shows a schematic block diagram illustrating a communication network 100 including an anchor node 101, an access router 105, a data base 106 and two mobile terminals 107 and 108. Anchor node 101 comprises two anchor components 102 and 103 deployed in parallel and operable independently from each other. Anchor component 102 is capable of handling registration messages and data packets according to the GTP mobility management protocol. Anchor component 103 is capable of handling registration messages and data packets according to the MIPv6 mobility management protocol. Anchor node 101 is capable of communicating with data base 106, access router 105 and mobile terminals 107 and 108. Anchor node 101 administrates a block of identifiers (such as user IDs) which are or can be assigned to mobile terminals 107, 108. Mobile terminal 107 is capable of communicating by means of the GTP and the MIPv6 mobility management protocol.

Although anchor components 102 and 103 are illustrated in FIG. 1 as two separate units, which means they are separately implemented inside anchor node 101, the two anchor components 102, 103 may also be integrated as a single component within the anchor node. In this case, mobile terminal 107 can use an appropriate mobility management protocol without any additional selection of specific anchor components by access router 105. Moreover, although anchor components 102 and 103 are shown as two separate components, both mobility management protocols GPT and MIPv6 are deployed in parallel within the protocol stack of anchor node 101.

Data base 106 is a central network address data base which manages network addresses and assignments of network addresses to mobile terminals and, optionally, to mobility management protocols. As shown in FIG. 1, data base 106 includes a receiving unit 110 for receiving identifiers associated with mobile terminals or subscribers (and optionally for receiving protocol information about associated mobility management protocols), an associating unit 111 for associating the identifier (and the optional protocol information) with a network address, and a transmitting unit 112 for transmitting the network address to the anchor node 101.

Anchor node 101 is communicating with data base 106 in context with registering mobile terminal 107 after a new network access. After receipt of a registration message from mobile terminal 107, anchor node 101 transmits a user ID relating to mobile terminal 107 to data base 106. The user ID is a unique identification of mobile terminal 107 within anchor node 101. In this embodiment, the registration message is sent directly, i.e. without passing access router 105, to anchor node 101. After receipt of the user ID and association thereof with a network address by unit 112, unit 113 of data base 106 returns the network address allocated to mobile terminal 107 to anchor node 101. Data base 106 manages that mobile terminal 107 has a common identity, i.e. a common network address, irrespective of the associated mobility management protocol GPT or MIPv6. This concept of a common identity may be realised by means of a mapping scheme, a mapping data base or a mapping method between anchor node 101 and data base 106.

The network address received from data base 106 is transmitted, together with information about the mobility management protocol associated with mobile terminal 107, from anchor node 101 to access router 105. As shown in FIG. 1, access router 105 comprises a receiving unit 113 for receiving the network address together with the information about the anchor component 102 or 103 associated with the mobile terminal 107, and a forwarding unit 114 for forwarding data packets from or addressed to the mobile terminal 117 depending on the anchor component 102 or 103 associated with the mobile terminal 107.

Based on the received information, access router 105 knows the particular anchor component 102 or 103 to which respective incoming data packets for as from mobile terminal 107 are to be forwarded. Access router 105 is now configured to receive incoming data packets for mobile terminal 107 (for example from mobile terminal 108) and to forward them to anchor node 101, i.e. to the appropriate anchor component 102 or 103. Furthermore, either anchor node 101 or access router 105 forwards the received network address to mobile terminal 107.

The anchor component may change depending on the network access technology mobile terminal 107 uses. For example, mobile terminal 107 may be connected at the same time via more than one network access technology, or it may voluntarily or in a forced manner change the network access technology. Access router 105 has thus to receive updated information with regard to which of the anchor components 102, 103 is currently handling data packets for mobile terminal 107.

Figure 2:
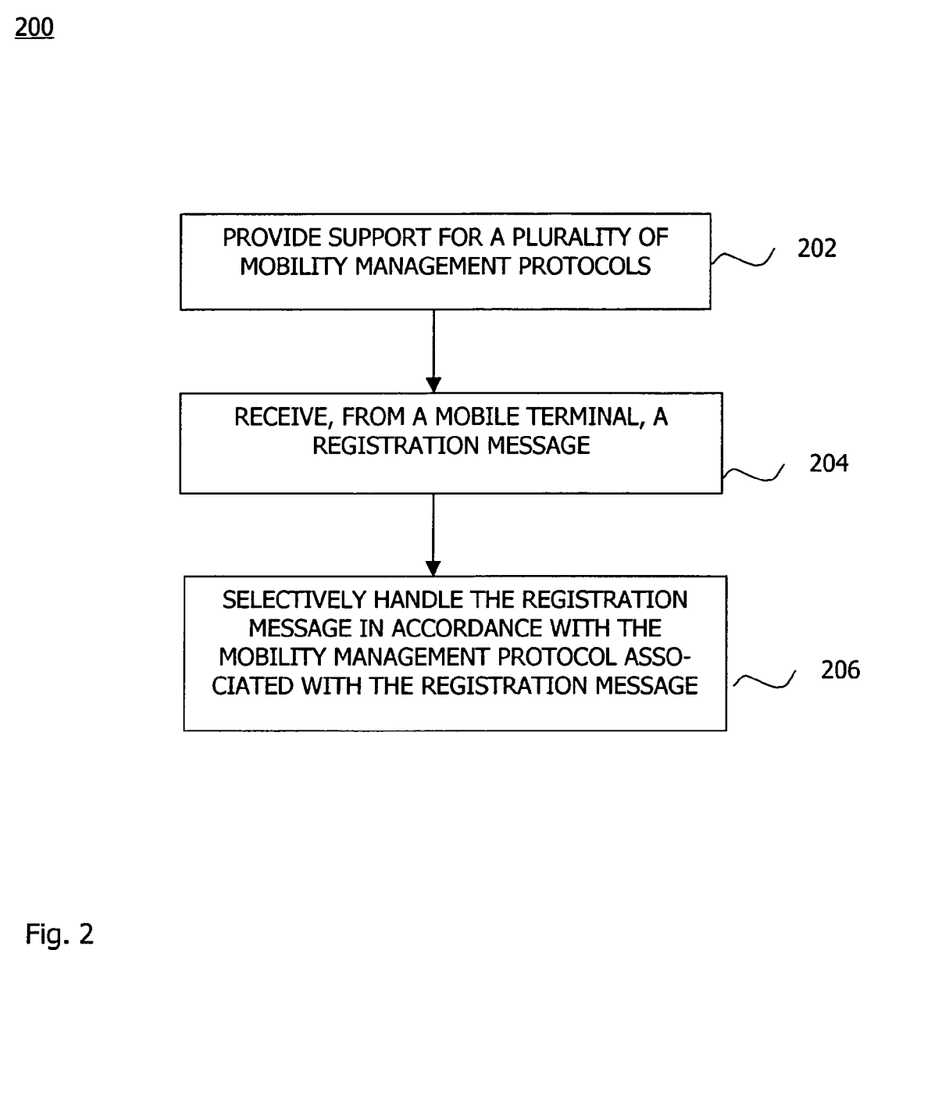
FIG. 2 is a flow chart illustrating a first method embodiment.

FIG. 2 shows a flow chart 200 of a first method embodiment of the present invention. The method embodiment relates to a registration of a mobile terminal with an anchor node and may be practiced by anchor node 101 shown in FIG. 1 or by other apparatuses.

The method starts in step 202 with providing support for a plurality of mobility management protocols such as GTP and MTPv6. The plurality of mobility management protocols are deployed in parallel within the protocol stack of the anchor node. In a next step 204, a registration message is received from a mobile terminal by the anchor node. Thereafter, in step 206, the received registration message is selectively handled in accordance with the mobility management protocol associated with the registration message. The mobile terminal is capable of communicating by means of the plurality of mobility management protocols.

Figure 3:
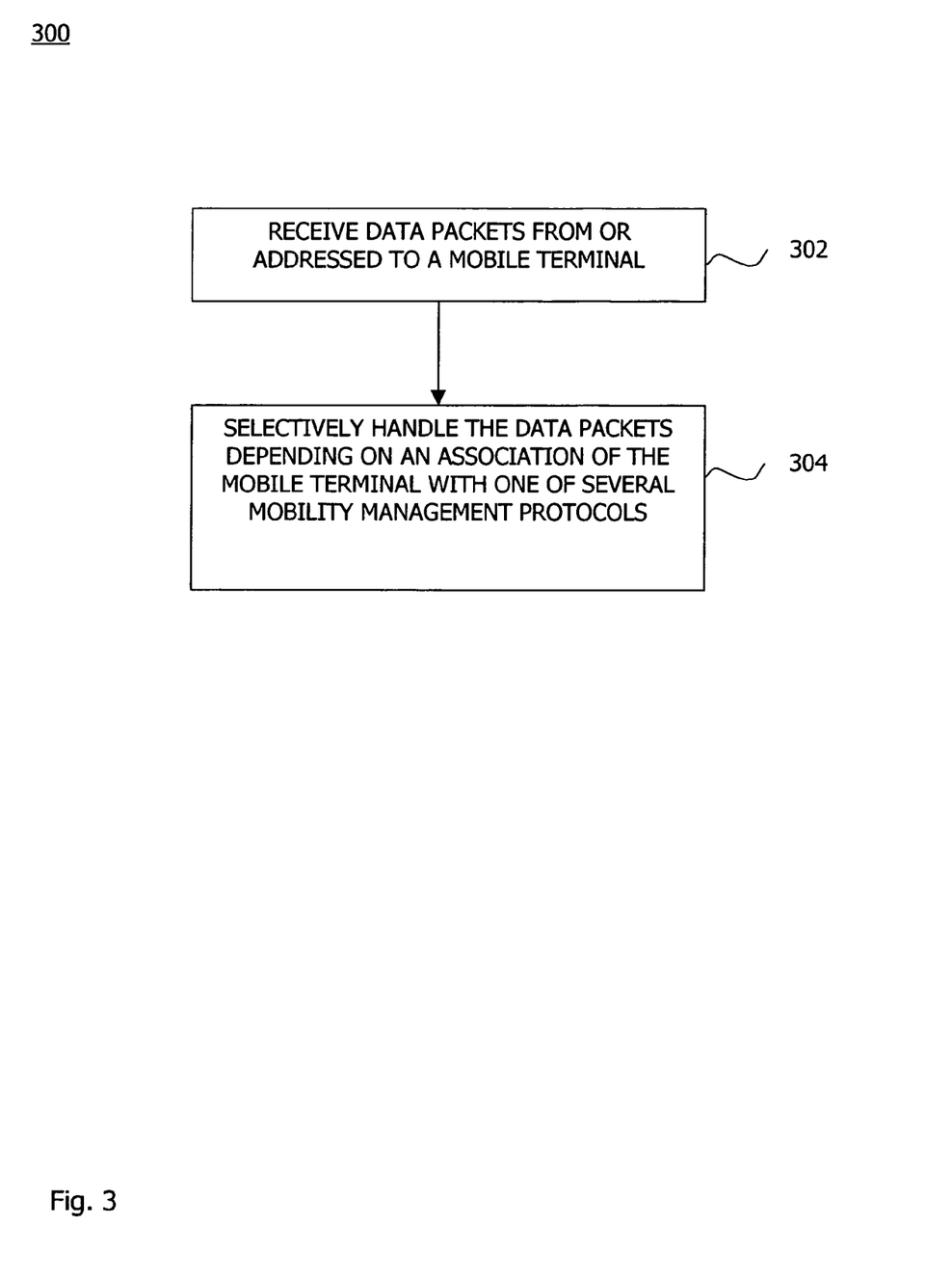
FIG. 3 is a flow chart illustrating a second method embodiment.

FIG. 3 shows a flow chart 300 of a further method embodiment. The method embodiment relates to handling data packets with a mobility management protocol and may be practiced by anchor node 101 shown in FIG. 1 or by other apparatuses.

As shown in FIG. 3, the method starts in step 302 with receiving data packets from or addressed to a mobile terminal. Thereafter, in step 304, the received data packets are selectively handled (e.g., forwarded) depending on an association of the mobile terminal with one of several mobility management protocols. The plurality of mobility management protocols are deployed in parallel within the protocol stack of the anchor node. The mobile terminal is capable of communicating by means of the several mobility management protocols.

Figure 4:
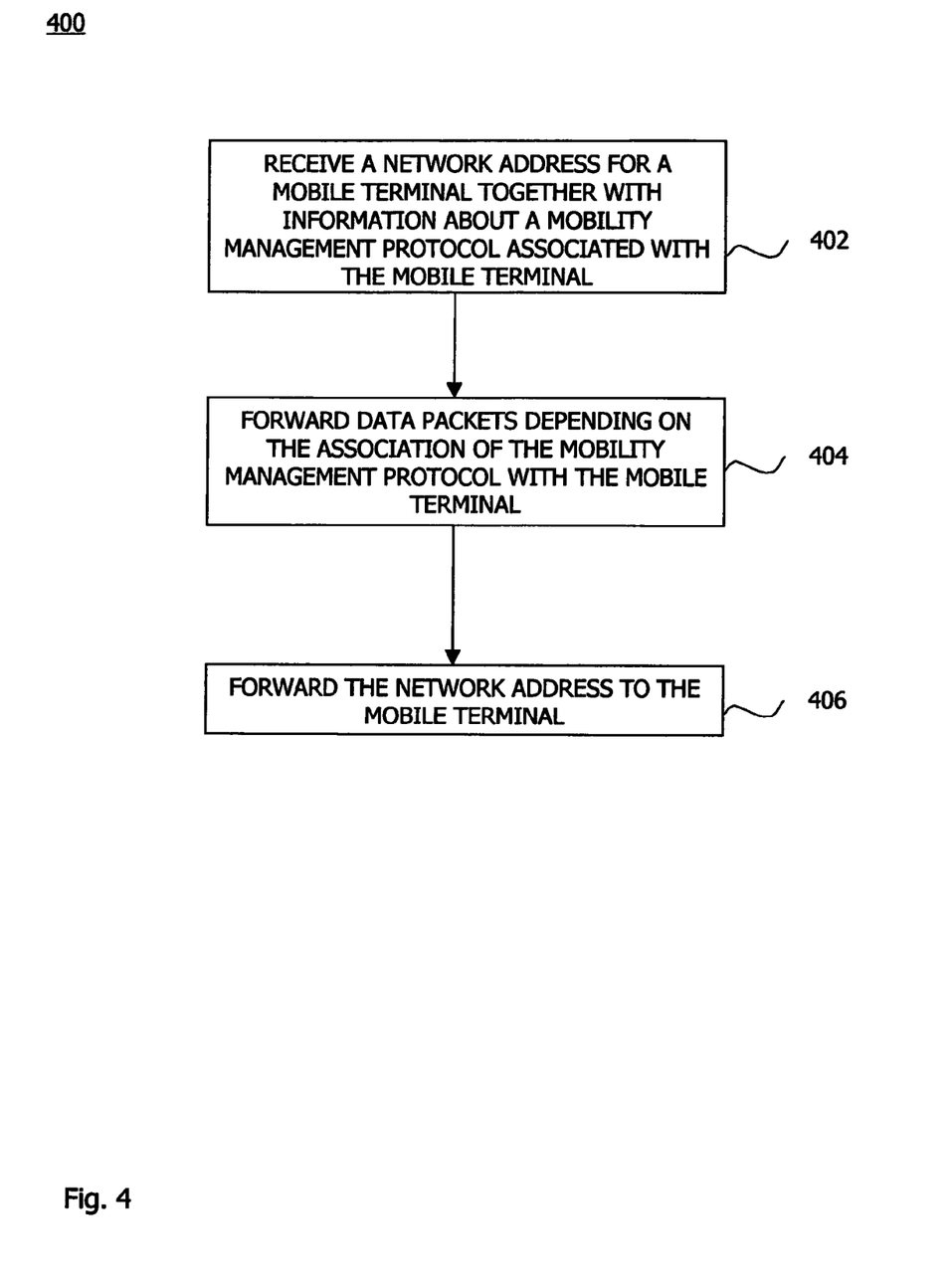
FIG. 4 is a flow chart illustrating a third method embodiment.

FIG. 4 shows a flow chart 400 of a further method embodiment. The method embodiment relates to handling data packets and may be practiced an access router 105 shown in FIG. 1 or by other apparatuses.

As shown in FIG. 4, the method starts in step 402 with receiving a network address for a mobile terminal together with information about a mobility management protocol associated with the mobile terminal. Thereafter, in step 404, data packets are forwarded depending on the association of the mobility management protocol with the mobile terminal. In an optional step 406, the network address received in step 402 is forwarded to the mobile terminal.

Figure 5:
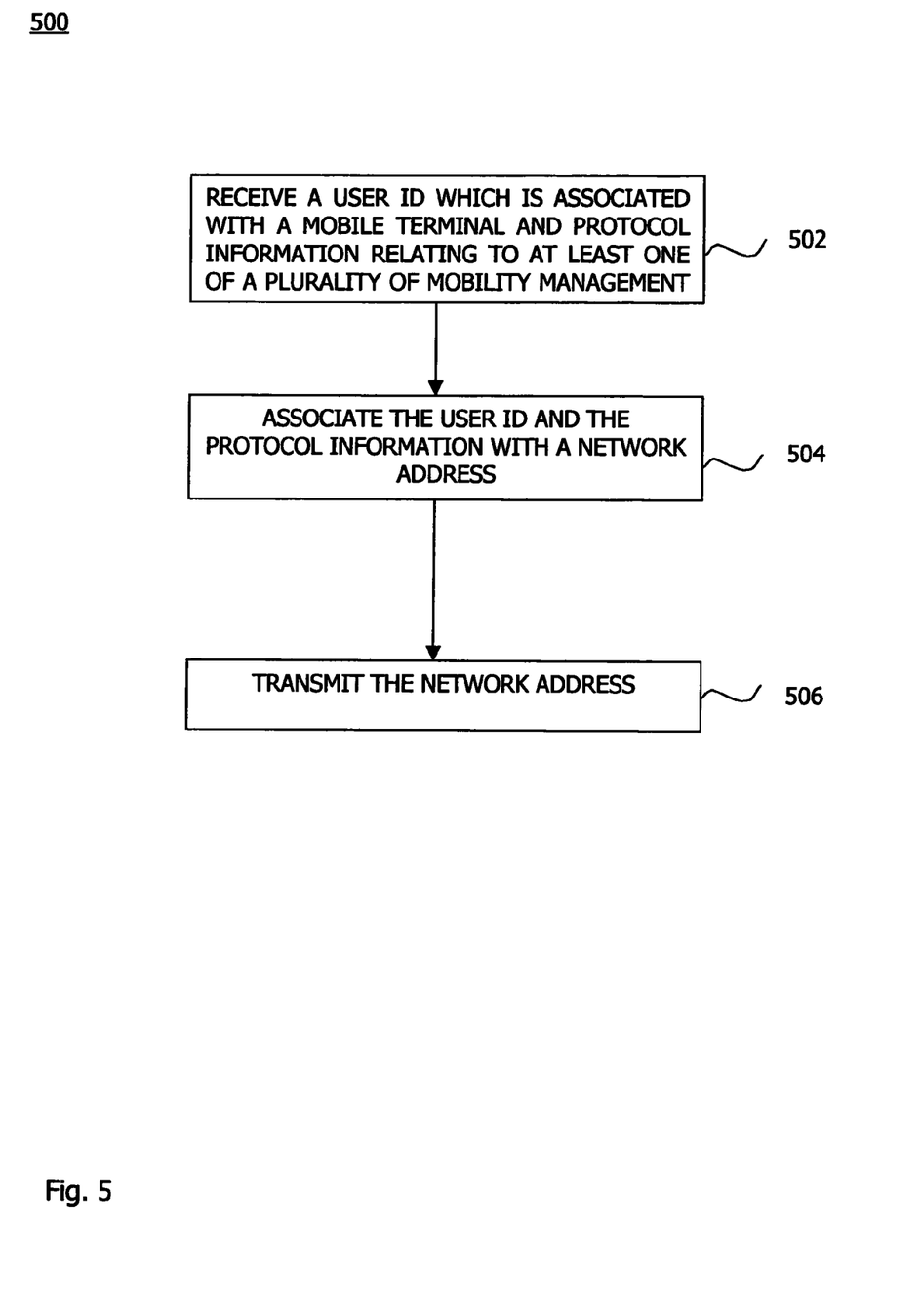
FIG. 5 is a flow chart illustrating a fourth method embodiment.

FIG. 5 shows a flow chart 500 of a further method embodiment. The method embodiment relates to registering a mobile terminal with an anchor node and may be practiced by data base 106 shown in FIG. 1 or by other apparatuses.

As shown in FIG. 5, the method starts in step 502 with receiving a user ID which is associated with a mobile terminal and at least one of a plurality of mobility management protocols that has been associated with the mobile terminal. Thereafter, in step 504, the user ID and the protocol information are associated with a network address. In a next step 506, the network address is transmitted to an anchor node.

In the following, as an exemplary embodiment and with reference to FIG. 1, an attachment of mobile terminal 107 to first anchor component 102 is described. First of all, anchor component 102 of anchor node 101 receives a first registration message from mobile terminal 107. This is realized in accordance with the GPT mobility management protocol of anchor component 102. For GTP, the first registration message is a Create PDP (Packet Data Protocol) Context message. In case a first registration of mobile terminal 107 with anchor component 103 would take place, a first Registration Request message or an IKEv2 message containing a configuration request for MIPv6 would be sent from mobile terminal 107 to anchor component 103.

As a next step, anchor component 102 contacts data base 106 and provides data base 106 with a user ID assigned to mobile terminal 107. Data base 106 allocates a home IP address or a subnet to mobile terminal 107 and returns this data to anchor component 102. A subnet in the sense of the present embodiment is an exact specification of a part of a set or range of IP addresses.

In a next step, access router 105 is informed by anchor component 102 that data packets assigned to the particular IP address or subnet are now processed by anchor component 102. Access router 105 forwards the allocated IP address or subnet to mobile terminal 107. After this step, the GTP mobility management protocol is operational. Mobile terminal 107 can from now on send and receive data packets and can also perform handovers using the GTP mobility management protocol. As long as mobile terminal 107 is in a network area that provides network access in accordance with the GTP mobility management protocol, there is no need to switch from anchor component 102 to anchor component 103.

However, in case mobile terminal 107 moves to a location which does not provide network access according to the GTP mobility management protocol or sets up a parallel second network connection, switching to anchor component 103 may be performed. Such switching from anchor component 102 to anchor component 103 may only take place in case mobile terminal 107 has network access according to the MIPv6 mobility management protocol. The decision on switching from one mobility management protocol to another mobility management protocol, i.e. from GTP to MIPv6, can either be initiated by mobile terminal 107 or the network. The system administrator may provide that the anchor component 102 or 103 to which the received data packets are to be switched supports the respective mobility management protocol.

Assuming that mobile terminal 107 is attached to the first anchor component 102, which is handling traffic in accordance with the GTP mobility management protocol, a (first) handover to the MIPv6 mobility management protocol requires the following steps: anchor component 103 receives a registration message according to the MIPv6 mobility management protocol (i.e., a Registration Request message or an IKEv2 message containing a configuration request). Thereafter, anchor component 103 contacts data base 106. Data base 106 reassigns the existing IP address or subnet to mobile terminal 107. Data base 106 thus provides that mobile terminal 107 receives the same IP address or subnet it has received when it was attached to anchor component 102. Mobile terminal 107 will therefore have a common identity within both mobility management protocols GPT and MIPv6.

The allocated IP address or subnet is thereafter forwarded from data base 100 to anchor node 101, from anchor node 101 to access router 105, and from access router 105 to mobile terminal 107. Thereafter, mobile terminal 107 can send and receive data packets and perform handovers in accordance with the MIPv6 mobility management protocol. As long as the MIPv6 mobility management protocol and its respective access technologies are accessible for mobile terminal 107, there is no need to switch back from anchor component 103 to anchor component 102, i.e. to switch from MIPv6 to GTP. However, switching may optionally occur in a forced manner based on network operator specific criteria.

For selecting one of the anchor components 102 and 103 for handling mobility management, generally two alternatives are possible. In case mobile terminal 107 attaches to a new one of the anchor components 102 or 103, the new anchor component de-registers with the old anchor component. If mobile terminal 107 intends to switch back to the previous anchor component, it re-registers with the previous anchor component. This leads to an automatic switching between anchor components 102 and 103 depending on the attachment. Alternatively, a special locating update message, which is sent by mobile terminal 107, may be used to instruct anchor node 101 to switch to a certain anchor component 102 or 103.

In the following, an embodiment is described in which the MIP mobility management protocol is used to control switching between the mobility management protocols. According to this embodiment, each time the mobile terminal 107 has access to its home access network (this is the definition according to MIP), mobility of mobile terminal 107 is handled according to the GTP mobility management protocol.

Switching from the first anchor component 102, which is handling GTP mobility management protocol processes, to the second anchor component 103, which is handling MIP mobility management protocol processes, is performed as follows. As an example, it is assumed that mobile terminal 107 has no longer access to a network which is working in compliance with a 3GPP standard, for example GSM, GPRS or UMTS. Therefore, mobile terminal 107 decides to switch to an available non-3GPP network, e.g. a W-LAN network which is working in compliance with MIPv6. Although this exemplary embodiment describes the case that mobile terminal 107 makes the decision to switch the access network, it is also possible that the network itself decides to switch. This may even be decided in case the 3GPP network access is still available (e.g., for load distribution purposes). Accordingly, mobile terminal 107 attaches to the non-3GPP access network, i.e. it attaches to anchor component 103. Subsequently, mobile terminal 107 sends a MIP Binding Update or Registration Request message to anchor component 103. Anchor component 103 is in this exemplary embodiment the home agent. Anchor component 103 determines that mobile terminal 107 is no longer within the network coverage area of the home network and informs access router 105 that mobility of mobile terminal 107 is from now on handled by anchor component 103. Accordingly, access router 105 forwards data packets directly to anchor component 103.

In case mobile terminal 107 decides to switch back from anchor component 103 to anchor component 102, which may be the case when mobile terminal 107 has again network access to a 3GPP network, mobile terminal 107 sends a MIP Return Home Binding Update or Registration Request message to anchor component 103. Anchor component 103 determines that mobile terminal 107 is (in the MIP sense) home again and informs access router 105 that mobile terminal 107 is again being served by anchor component 102. Data base 106 will be updated accordingly.

In the above described embodiment according to FIG. 1, anchor node 101 comprises two anchor components 102 and 103. However, the present invention is not limited to two anchor components and may be extended to more than two anchor components. Accordingly, more than two mobility management protocols may be handled in parallel. It is also possible that no separate anchor components are present within the anchor node. Two or more anchor components may be integrated within an anchor node. Access router 105 and/or anchor node 101 and/or data base 106 may also be integrated in one unit.

As regards data packet routing, in the uplink direction, the data packets are sent from the mobile terminal 107 to anchor node 101. One of anchor components 102 and 103 processes the received data packets if required (e.g., by performing a decapsulation), and transmits them to mobile terminal 108 or an external IP network (not shown). Data packets may be tunneled from mobile node 107 to anchor node 101 without passing access router 105. This is possible, since the tunnel ends at either anchor component 102 or anchor component 103.

As regards data packet routing in the downlink direction, data packets arrive at access router 105, which advertises the IP address block managed by data base 106 (including the IP address assigned to mobile terminal 107). Subsequently, access router 105 determines the anchor component 102 or 103 active for the mobile terminal 107 and transmits the data packets to the respective active anchor component 102 or 103.

In case anchor components 102 and 103 are implemented separately within anchor node 101, access router 105 has the following possibilities for determining which anchor component 102 or 103 is in use:

1. In case the access router 105 is situated within the same subnet as the anchor node 101, each anchor component 102 and 103 performs a request according to the gratuitous Address Resolution Protocol (gARP) for determining IP addresses or provides a proxy Neighbour Discovery (pND) for the mobile terminals it serves. Thereby, traffic addressed to those mobile terminals is attracted. At the anchor node 101, the old anchor component 102 or 103 stops performing gARP and pND and the new anchor component 102 or 103 takes over. The access router 105 stores such anchor information in its ARP or ND.

2. The anchor components 102, 103 directly submit relevant information to the access router 105. The access router 105 may then tunnel data packets to the current anchor component 102, 103. In case the access router 105 is located on the same subnet, it can also address the data packets to the Media Access Control (MAC) address of the anchor component 102, 103.

3. The access router 105 may perform policy control functions. The last step in the policy list may be an order to transmit the data packets to the current anchor component 102, 103. For each change of an anchor component 102, 103, the policies in the access router 105 need to be updated by the entity which is controlling it.

As has become apparent from the above embodiments, a plurality of mobility management protocols can be managed independently from each other in a side-by-side manner to provide enhanced mobility management techniques. Using these techniques, existing mobility management protocols can for example be further used when the communication network is migrated to new mobility management protocols. Furthermore, existing mobility management protocol can also be combined with new mobility management protocols. This provides a facilitated migration to future mobility management protocols. Instead of replacing well-established mobility management protocols, new mobility management protocols thus can be simply added and can co-exist side-by-side with well-established mobility management protocols. Such flexibility also enables backward compatibility with regard to older mobility management protocols. Existing and valued features of well-established mobility management protocols, which were designed for a particular set of network accesses scenarios, do not have to be re-implemented in the new mobility management protocol.

The approach proposed herein has the further advantage that the signalling and processing overhead is decreased as compared to a scenario in which two mobility management protocols are stacked upon each other in a hierarchical manner. In such a hierarchical network structure, one of the mobility management protocols may for example be used as a global mobility management protocol. This global mobility management protocol manages mobility of mobile terminals between certain larger mobility domains. Another mobility management protocol may be used as a local management protocol which manages mobility within a smaller mobility domain. However, problems may arise with such a hierarchical network structure in case two mobility management protocols are to be employed that are both capable of working as a global mobility management protocol. In such a case, designating a global-local relationship between the mobility management protocols is difficult (since global mobility management is only realised by means of local mobility management) and creates an undesirable dependence between the protocols. Furthermore, two mobility management protocols have to be processed and managed at the same time in parallel to each other. This requires high processing power within the network elements and the signalling load increases. Moreover, in order to route data packets to the desired mobile terminals, a plurality of mobility anchors in the transmission path of the user plane traffic are necessary. According to the present solution, two mobility management protocols are implemented side-by-side and may be selectively and independently activated. Therefore, a smaller number of anchor nodes may be sufficient in the transmission path of the user plane traffic.

A further advantage of the approach proposed herein is that terminal centric and network centric mobility management protocols can be installed side-by-side at the same time.

Although embodiments of the present invention have been illustrated in the accompanying drawings and described in the description, it will be understood that the invention is not limited to the embodiments disclosed herein. In particular, the invention is capable of numerous rearrangements, modifications and substitutions without departing from the scope of the invention as set forth and defined by the following claims.

The invention claimed is:

1. A method for registering a mobile terminal with an anchor node acting as a mobility anchor for mobile terminals, the anchor node being in communication with a database and an access router, the method comprising:
   providing support for a plurality of mobility management protocols, wherein the plurality of mobility management protocols is deployed in parallel within a protocol stack of the anchor node.
   receiving, from the mobile terminal, a first registration message;
   selectively handling the first registration message in accordance with a mobility management protocol associated with the first registration message;
   sending, to the database, based on the first registration message, a first identifier associated with the mobile terminal and protocol information about a first mobility management protocol associated with the mobile terminal;
   receiving, from the database, in response to the sent first identifier, a network address;
   forwarding the network address and the information about the first mobility management protocol to the access router;
   receiving, from the mobile terminal, a second registration message;
   sending, to the database, based on the second registration message, a second identifier associated with the mobile terminal and protocol information about a second mobility management protocol associated with the mobile terminal;
   receiving, from the database, in response to the sent second identifier, the network address; and
   forwarding the network address with information about the second mobility management protocol to the access router.

2. The method of claim 1, wherein the mobile terminal is configured to communicate using the plurality of mobility management protocols.

3. The method of claim 1, wherein an association of the mobile terminal with one of the plurality of mobility management protocols is dependent on whether the mobile terminal has access to a home access network.

4. The method of claim 3, wherein access to a home network is indicated by a location update message.

5. The method of claim 4, wherein the location update message is a binding update message.

6. The method of claim 4, wherein the location update message is a registration request message.

7. The method of claim 1, wherein an association of the mobile terminal with one of the plurality of mobility management protocols is dependent on a geographical location of the mobile terminal.

8. The method of claim 1, wherein an association of the mobile terminal with one of the plurality of mobility management protocols is dependent on a topological location of the mobile terminal.

9. An anchor node for use in a communication network, the anchor node configured as a mobility anchor for mobile terminals, the anchor node communicating with a database and an access router, the anchor node comprising:
- a first anchor component for handling registration messages according to a first mobility management protocol;
- a second anchor component for handing registration messages according to a second mobility management protocol, wherein the first anchor component and the second anchor component are deployed in parallel within the anchor node;
- a processor; and
- a computer-readable medium, coupled to the processor, the computer-readable medium comprising computer-readable instructions, when executed by the processor, the computer-readable instructions are configured to
  - send, to the database, a first identifier associated with a mobile terminal and protocol information about the first mobility management protocol associated with the mobile terminal,
  - receive, from the database, in response to the sent first identifier, a network address,
  - forward the network address with information about the first mobility management protocol to the access router,
  - send, to the database, a second identifier associated with the mobile terminal and protocol information about the second mobility management protocol associated with the mobile terminal,
  - receive, from the database, in response to the sent second identifier, the network address, and
  - forward the network address and information about the second mobility management protocol to the access router.

* * * * *

UNITED STATES PATENT AND TRADEMARK OFFICE
CERTIFICATE OF CORRECTION

PATENT NO. : 8,463,926 B2  
APPLICATION NO. : 12/682368  
DATED : June 11, 2013  
INVENTOR(S) : Turanyi et al.

Page 1 of 1

It is certified that error appears in the above-identified patent and that said Letters Patent is hereby corrected as shown below:

In the Claims

In Column 14, Line 23, in Claim 1, delete "node." and insert -- node; --, therefor.

In Column 15, Line 12, in Claim 9, delete "handing" and insert -- handling --, therefor.

In Column 15, Line 21, in Claim 9, delete "configure to" and insert -- configure to: --, therefor.

Signed and Sealed this  
First Day of October, 2013

Teresa Stanek Rea  
*Deputy Director of the United States Patent and Trademark Office*